Nov. 24, 1970          W. J. MEIS          3,541,836
SHEET METAL CRIMPING DEVICE
Filed March 18, 1968
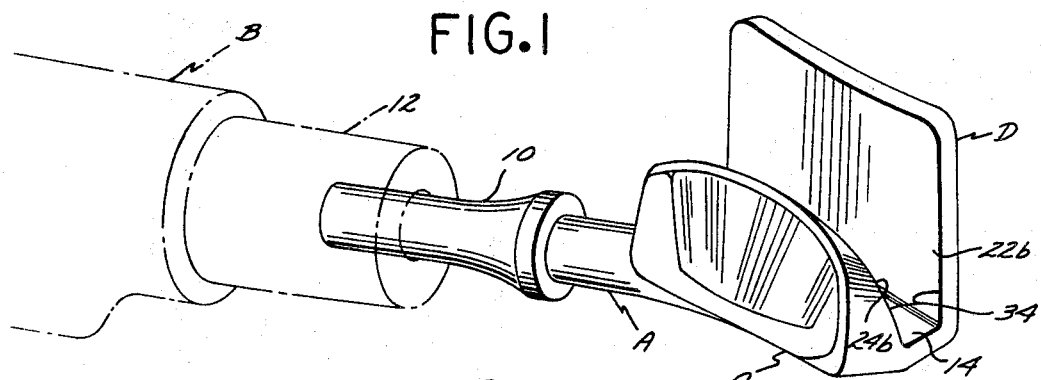
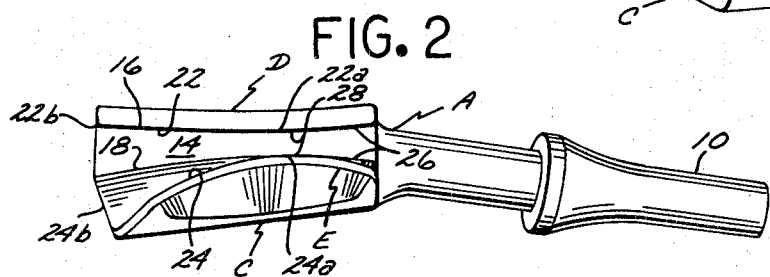
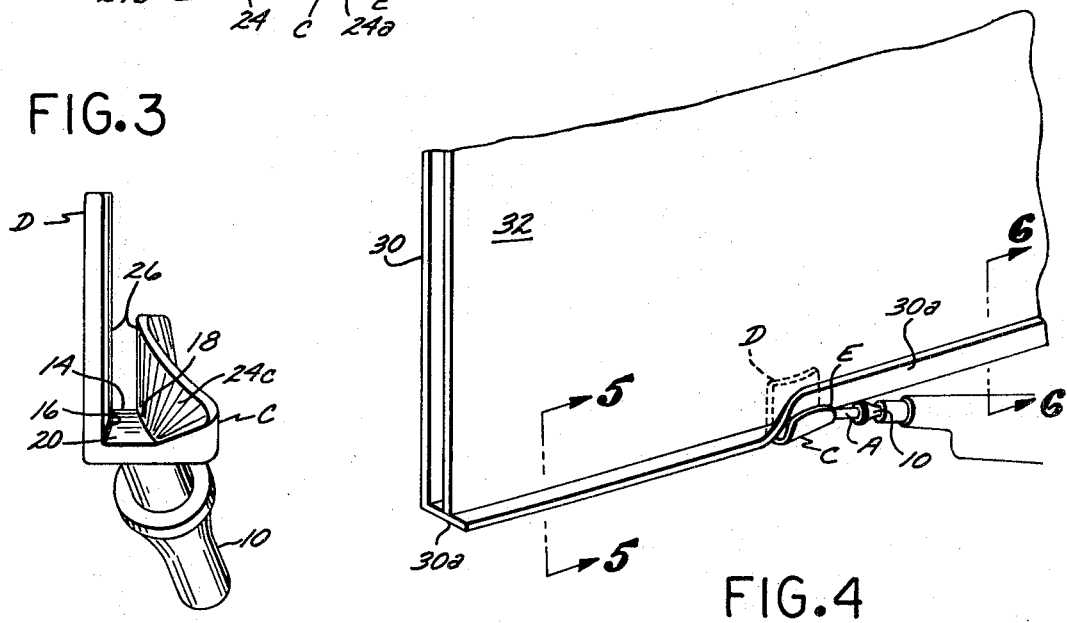
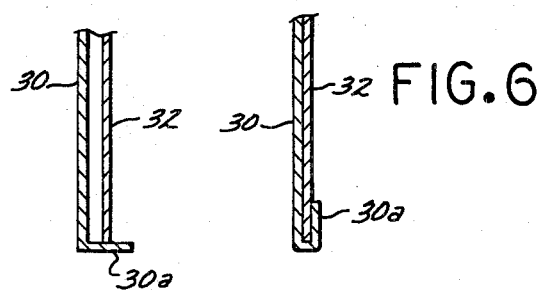
INVENTOR.
WILLIAM J. MEIS
BY
William G. Babcock
ATTORNEY

3,541,836
SHEET METAL CRIMPING DEVICE
William J. Meis, 3632 Camerino St.,
Lakewood, Calif. 90712
Filed Mar. 18, 1968, Ser. No. 713,572
Int. Cl. B21c 3/16
U.S. Cl. 72—476      4 Claims

ABSTRACT OF THE DISCLOSURE

A crimping tool adapted to be removably supported from a vibrating socket of a pneumatic hammer, and when so supported, may be used to crimp a longitudinally extending lip of a first sheet into overlapping, gripping contact with a longitudinal edge portion of a second sheet.

BACKGROUND OF THE INVENTION

Field of the invention

The present invention relates to an improvement in sheet metal working tools of a type particularly adapted for use in the repair of automotive vehicles.

Description of the prior art

In the repair of automotive vehicles, a particularly the doors thereof, it is necessary to deform a longitudinally extending lip of a first metallic sheet from an outwardly extending position to bring it into overlapping crimping contact with a longitudinal edge of a second sheet. In the past, crimping of such a lip has been carried out by a variety of processes, each of which have been time consuming and required a high degree of skill on the part of the operator to prevent buckling and wrinkling of the sheet metal. When the tool of the present invention is used in combination with an air hammer it is possible for a sheet metal worker with but limited skill to smoothly and permanently deform a projecting lip of a first metallic sheet into crimping contact with a second sheet. Also, use of the present tool permits such sheet metal crimping to be carried out within a minimum period of time.

SUMMARY OF THE INVENTION

An elongate tool that is removably supported in the vibrating socket of an air hammer and angularly disposed relative thereto, which tool includes a web and first and second flanges, the interior surfaces of which are convex and so arranged that as the vibrating tool is passed along a longitudinally extending lip of a first sheet, the lip is permanently deformed into gripping contact with the longitudinal edge of a second sheet.

A major object of the present invention is to provide an inexpensive tool of relatively simple structure that may be removably mounted on an air gun for use in easily and quickly deforming a longitudinally extending lip of a first sheet into crimping contact with a second sheet without wrinkling, buckling, or otherwise defacing either of the two sheets.

Another object of the invention is to supply a tool that this is simple and easy to use which permits a sheet metal lip to be deformed into crimping contact with a second sheet by a person with but limited skill and experience in sheet metal work.

A still further object of the invention is to furnish a tool particularly adapted for use in the repair of automotive sheet metal work in which such work must be carried out when the sheet metal is in place on the automotive vehicle.

BRIEF DESCRIPTION OF THE DRAWING

FIG. 1 is a perspective view of the sheet metal crimping tool mounted on the reciprocating socket of an air hammer;

FIG. 2 is a top plan view of the crimping tool;

FIG. 3 is an end elevational view of the tool;

FIG. 4 is a perspective view of the tool shown crimping a lip on a first sheet over the longitudinal edge of a second sheet;

FIG. 5 is a transverse cross-sectional view of the first and second sheets prior to crimping the lip onto the second sheet by the use of the tool, taken on the line 5—5 of FIG. 4; and FIG. 6 is a tranverse cross-sectional view of the first and second sheets after the tool has crimped the lip into gripping contact with the second sheet.

DESCRIPTION OF THE PREFERRED EMBODIMENTS

In FIG. 1 it will be seen that the tool A includes an elongate shank 10 that removably and frictionally engages a vibrating socket 12 of a conventional air hammer B. The forward end of shank 10 develops into an elongate web 14 that is angularly disposed relative thereto, and this web forms a part of a body C. Shank 10 slopes downwardly and rearwardly from body C, as may best be seen in FIG. 4, for ease in using same. The shank 10 is also angularly disposed relative to the longitudinal axis of web 14, as shown in FIG. 2.

Web 14 includes first and second inwardly curving side edges 16 and 18, respectively, as illustrated in FIGS. 2 and 3, and the upper longitudinally extending face of this web is convex. A first flange D extends upwardly from first edge 16 (FIGS. 1 and 2), which flange is preferably generally rectangular and includes a convex, longitudinally extending first convex surface 22.

A second flange E projects outwardly from second edge 18 in the same direction as first flange D. The web 14, shank 10, and first and second flanges D and E are preferably formed as an integral unit from a suitable metal such as steel, or the like. Flange E includes a second interior convex, longitudinally extending surface 24 of lesser radius curvature than that of surface 22.

The two convex surfaces 22 and 24 in combination with face 20 define an elongate confined space 26, as shown in FIG. 3. At the adjacent positions 22a and 24a of surfaces 22 and 24 they are laterally spaced a distance 28 that is slightly greater than the combined thickness of a first sheet 30, lip 30a, and second sheet 32, as may be seen in FIGS. 4, 5 and 6.

Prior to being crimped over the second sheet 32, as shown in FIG. 6, the lip 30a occupies the outwardly extending position illustrated in FIG. 5. The forward extremities 22b and 24b of surfaces 22 and 24 are laterally spaced a distance 34 that is at least as wide as the width of the lip 30a. Surface 24 also includes a forwardly disposed, upwardly and outwardly extending section 24c, (FIG. 3) that initiates the deformation of lip 30a from the position shown in FIG. 5 to that illustrated in FIG. 6.

Use and operation of the tool A are most simple. When the tool A is mounted on the air gun B as shown in FIG. 4, the tool is moved into engagement with the sheets 30, 32 and lip 30a when they are engaged in the manner shown in FIG. 5. As the tool A is moved longitudinally along the sheets 30 and 32 and vibrated by the air gun B, these sheets are forced together, and the lip 30a crimped upwardly to the position shown in FIG. 6. The lip 30a is initially bent upwardly towards the crimping position by causing it to contact the second flange section 24c shown in FIG. 3.

The crimping operation is completed when sections of the sheets 30 and 32 and lip 30a are moved through the opening 28 defined between the surface portions 22a and 24a illustrated in FIG. 2. During this crimping operation the first flange serves as a guide, and is at all times in slidable contact with the face of first flange D most remote from the second flange E. To prevent inadvertent displacement of flange D from its guiding position it is of substantially greater height than the second flange E.

I claim:

1. In combination with a pneumatic hammer provided with a power-driven reciprocating socket, a device for crimping a longitudinally extending deformable lip of metallic first sheet over a second rigid sheet disposed adjacent to said first sheet, which device comprises:
   (a) an elongate shank, a first end of which is removably supported in said socket;
   (b) a body extending forwardly from a second end portion of said shank and angularly disposed relative thereto, with said body including:
      (1) an elongate web having first and second inwardly curving longitudinal edges and a convex longitudinally extending first face;
      (2) a first flange extending outwardly from said first edge away from said first face, which first flange has a longitudinally extending convex first surface; and
      (3) a second flange extending outwardly from said second edge in the same direction as that of said first flange, which second flange has a longitudinally extending convex second surface that is laterally spaced from said first surface, with said first and second surfaces cooperatively defining a longitudinally extending confined space that varies in width and at an intermediate position therein is substantially the combined thickness of said first and second sheets and said lip, and said body when reciprocated and moved longitudinally relative to said first and second sheets and said lip permanently deforming the latter into crimping contact with said second sheet to lock said first and second sheets together.

2. A device as defined in claim 1 wherein said first flange is of substantially greater height than that of said second flange and said first surface of said first flange slidably engages said first sheet as said body is moved longitudinally relative thereto.

3. A device as defined in claim 2 wherein the radius of curvature of said second surface is substantially less than the radius of curvature of said first surface.

4. A device as defined in claim 2 wherein the radii of curvature of said first face and said first and second surfaces are so related that said lip can be deformed from a position substantially normal relative to said second sheet into said crimping position as said tool is moved longitudinally along said first and second sheets.

References Cited

UNITED STATES PATENTS

| | | | |
|---|---|---|---|
| 1,737,583 | 12/1929 | Furstenburg | 72—479 |
| 2,637,292 | 5/1953 | George | 72—479 |

CHARLES W. LANHAM, Primary Examiner

B. J. MUSTAIKIS, Assistant Examiner

U.S. Cl. X.R.

29—200; 72—479